United States Patent [19]

McNamee

[11] Patent Number: 4,779,918
[45] Date of Patent: Oct. 25, 1988

[54] RV PRIVACY AND SUNSCREEN

[76] Inventor: Thomas C. McNamee, 2451 Monaco Dr., Oxnard, Calif. 93035

[21] Appl. No.: 45,529

[22] Filed: May 4, 1987

[51] Int. Cl.$^4$ .............................................. B60J 1/20
[52] U.S. Cl. .................................... 296/95.1; 296/152
[58] Field of Search ................ 296/97 R, 97 A, 97 C, 296/97 F, 95 C

[56] References Cited

U.S. PATENT DOCUMENTS

| | | | |
|---|---|---|---|
| 2,370,521 | 2/1945 | Bourke et al. | 296/97 R |
| 2,718,912 | 9/1955 | Zimmerman | 296/95 C |
| 2,821,248 | 1/1958 | Irvine | 296/95 C |
| 3,895,859 | 7/1975 | Yoshida et al. | 296/95 C |
| 4,049,036 | 9/1977 | Gebhardt | 296/95 C |
| 4,607,875 | 8/1986 | McGirr | 296/97 R |

FOREIGN PATENT DOCUMENTS

| | | | |
|---|---|---|---|
| 1444149 | 5/1966 | France | 296/95 C |
| 0209614 | 12/1983 | Japan | 296/95 C |
| 1145463 | 3/1969 | United Kingdom | 296/97 F |

*Primary Examiner*—James B. Marbert
*Attorney, Agent, or Firm*—Donald A. Streck

[57] ABSTRACT

A removable, flexible, easily stored, combination privacy/sunscreen for use on the windshield and adjacent side windows of a recreational vehicle to limit light and outside viewing into the vehicle while permitting outside viewing from inside the vehicle. A sheet of flexible cloth material is shaped to fit over the outside of the windshield and adjacent side windows of the vehicle and includes means for releasably attaching the sheet to the vehicle in the above-described position. The sheet is of a non-woven material and comprises a plurality of closely spaced rows disposed on and bonded to a plurality of columns with the rows and columns disposed at right angles to one another and offset from one another. The material forming the rows is thicker and closer spaced than the material forming the columns and, further, forms a tortuous path for the passage of light therethrough which limits the maximum light passage area of the sheet to less than 30%. The preferred combination screen has a center portion for fitting over the windshield of the vehicle and a pair of outer portions attached to and carried by the center portion for fitting over vehicle side windows adjacent the windshield with the rows of the outer portions being angled with respect to the rows of the center portion such that the rows and columns of all the portions are disposed horizontally and vertically, respectively, when the screen is in use.

4 Claims, 2 Drawing Sheets

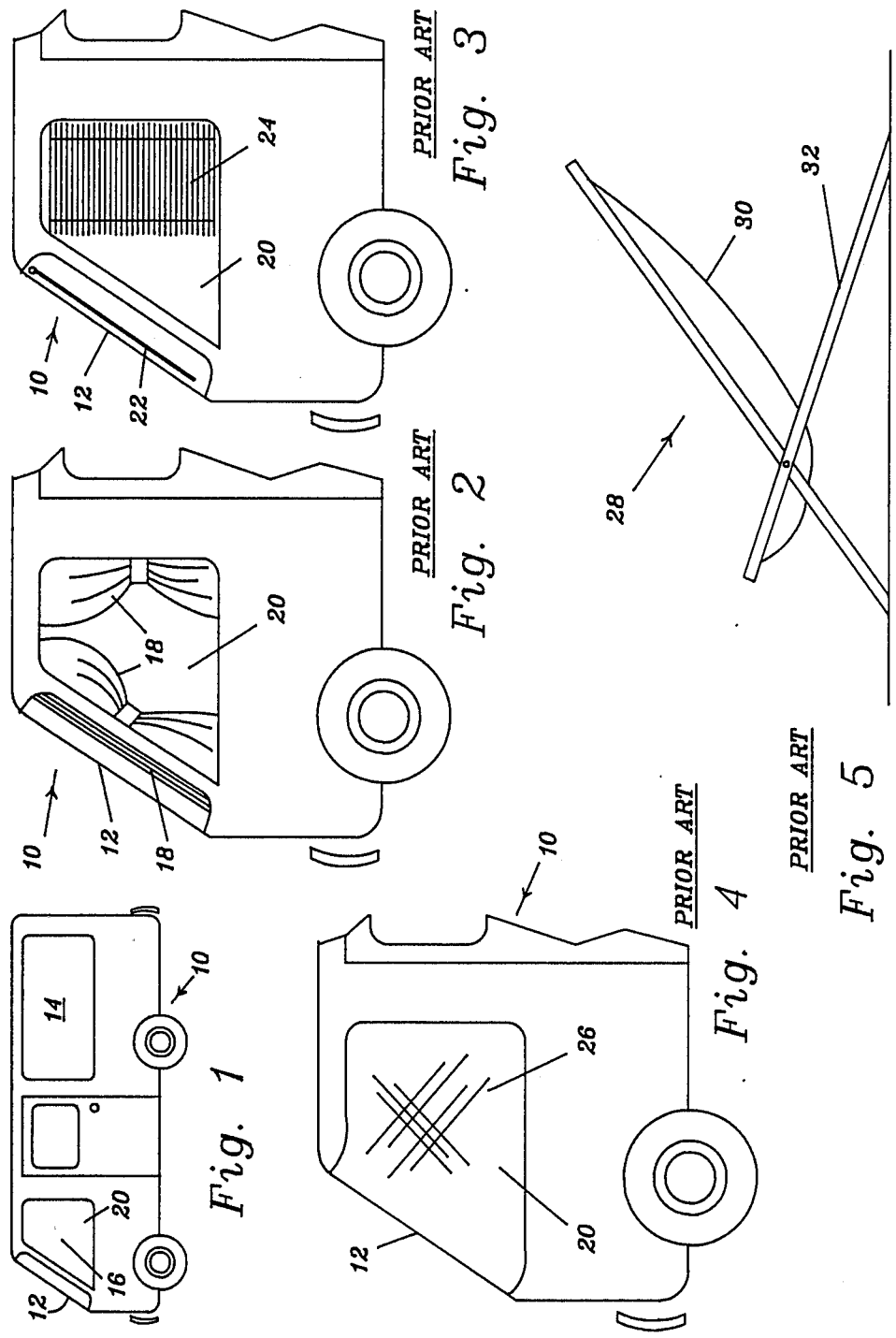

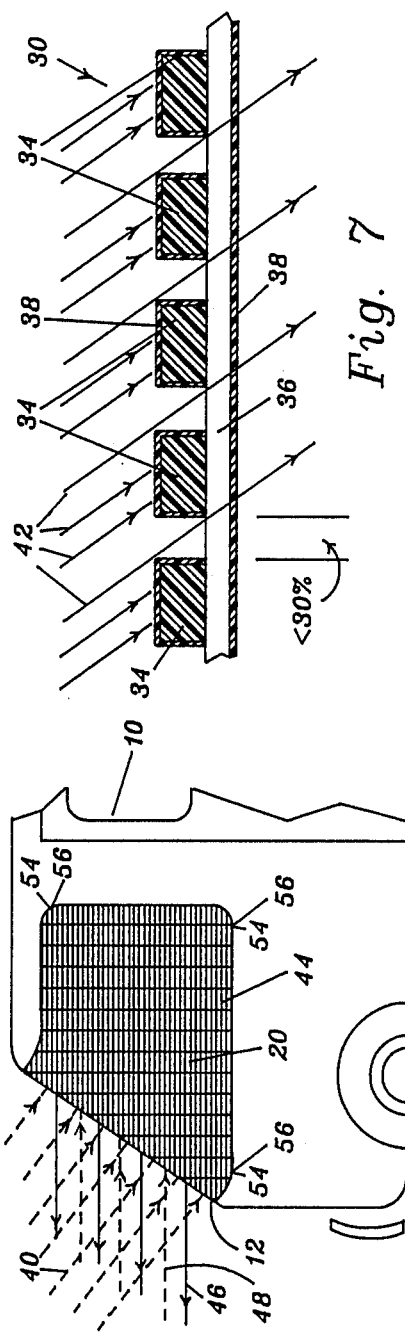
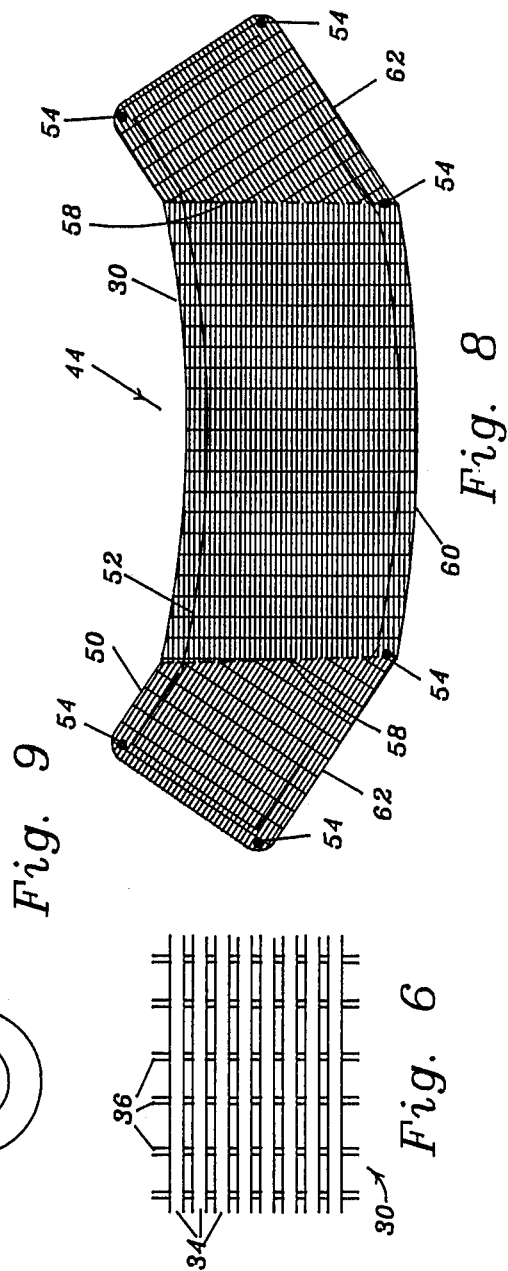
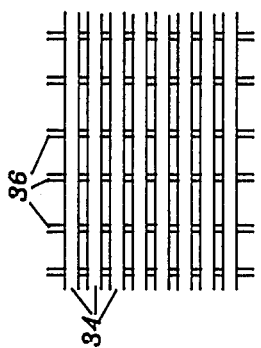

RV PRIVACY AND SUNSCREEN

BACKGROUND OF THE INVENTION:

The present invention relates to privacy and shade window coverings and, more particularly, to a combination privacy and sunscreen for use on windows of recreational vehicles to limit light and outside viewing from entry into the vehicle while permitting viewing from inside the vehicle comprising, a sheet of flexible cloth material shaped to fit over the outside of the windshield and adjacent side windows of the vehicle and including means for releasably attaching the sheet to the vehicle in the above-described position, the sheet being of a non-woven material and comprising a plurality of closely spaced rows disposed on and bonded to a plurality of columns with the rows and columns disposed at right angles to one another and offset from one another, the material forming the rows being thicker and closer spaced than the material forming the columns and further forming a tortuous path for the passage of light therethrough which limits the maximum light passage area of the sheet to less than 30%.

Recreational vehicles (RVs) such as that generally indicated as 10 in FIG. 1 have been available for a number of years now. RVs such that of FIG. 1 are generally open throughout from the windshield 12 to the back side window 14. This is opposed to camper "shells" which fit on the back of a pickup truck wherein the driver's cab is separate from the living area and usually connected by a "boot" replacing the rear window of the truck which is easily closed off for privacy. When an RV such as 10 is parked for camping purposes, it is desirable to block the entry of the sun's rays so as to prevent the so-called "greenhouse effect" within the RV 10 which tends to turn the interior into a hothouse. Moreover, it is also desirable to provide privacy for the occupants.

Various conventional and specialized window coverings according to the prior art can be used on windows such as back side window 14 which are removed from the driver's compartment at 16. When such prior art coverings are employed in the windows of the driver's compartment 16, the results are undesirable to say the least. For example, in FIG. 2 draw drapes 18 are shown attached to the windshield 12 and driver's side window 20. As can be appreciated, the major problem with the drapes 18 is their interference with vision at the sides of the windshield 12 and window 20 when they are "opened". There is just too much material to store out of the way. Moreover, when closed for privacy, they also block the view of the occupants from looking out.

As shown in FIG. 3, similar problems occur with the use of roll windowshades 22 and venetian blinds 24. Since the windshield 12 is generally curved, a plurality of roll windowshades must be used, and there is no looking out once the windowshades 22 have been lowered. Similarly, as can be seen with reference to FIG. 3, venetian blind 24 is rectangular and is not adapted for use with the non-rectangular windows (or the slanted windshield 12 for that matter) which are normally used for the side windows 20 of the driver's compartment 16. Venetian blind-slatted insect screening is also unworkable because it is flexible only in the vertical direction as with a true venetian blind and, therefore, cannot adapt to a curved windshield.

The prior art approach to the above-described problem has been the use of an opaque screen 26 over the windshield 12 and driver's side windows 20 adjacent thereto - either as a single unit as shown in FIG. 4 or as three separate pieces for the windshield and side windows, respectively. The screen 26 is generally of heavy vinyl material such as that known as Naugahide ®. The screen 26 is attached over the window areas after the vehicle is parked by way of snap fasteners, or the like. As can be appreciated, while blocking undesired sun's rays and affording privacy, the screen 26 completely blocks all light from entry into the vehicle and prevents the occupants from looking out.

Wherefore, it is the object of the present invention to provide a privacy sunshade which is light weight and flexible for easy out of the way storage and which can be disposed over the windshield and adjacent side windows of a recreational vehicle so that undesired outside viewing into the vehicle and the entry of undesired sun's rays are prevented while light to a desired level is permitted entry and the occupants are able to see out.

SUMMARY

The foregoing object has been achieved in the combination privacy and sunscreen for use on windows of recreational vehicles of the present invention comprising, a sheet of flexible cloth material shaped to fit over the outside of the windshield and adjacent side windows of the vehicle and including means for releasably attaching the sheet to the vehicle in the above-described position. The sheet is of a non-woven material and comprises a plurality of closely spaced rows disposed on and bonded to a plurality of columns with the rows and columns disposed at right angles to one another and offset from one another. The material forming the rows is thicker and closer spaced than the material forming the columns and thus forms a tortuous path for the passage of light therethrough which limits the maximum light passage area of the sheet to less than 30%.

In the preferred embodiment, the screen is particularly adapted for use on the windshield and adjacent driving compartment side windows. For that purpose, the screen has a center portion for fitting over the windshield of the vehicle and a pair of outer portions for fitting over vehicle side windows adjacent the windshield. The rows of the outer portions are angled with respect to the rows of the center portion such that the rows and columns of all the portions are disposed horizontally and vertically, respectively, over both the windshield and the side windows when the screen is positioned over the windshield and adjacent side windows for use.

DESCRIPTION OF THE DRAWINGS

FIG. 1 is a simplified side view of a recreational vehicle of the type wherein the present invention is particularly intended for use.

FIG. 2 is a simplified drawing showing prior art drapes as employed in the windshield and driver's compartment area of a recreational vehicle and the problems attendant therewith.

FIG. 3 is a simplified drawing showing prior art roll shades and venetian blinds as employed in the windshield and driver's compartment area of a recreational vehicle and the problems attendant therewith.

FIG. 4 is a simplified drawing showing a prior art opaque plastic material privacy cover as employed over the windshield and driver's compartment area windows of a recreational vehicle.

FIG. 5 is a simplified drawing showing the typical prior art use for the material employed in the present invention.

FIG. 6 is an enlarged drawing of a portion of the material of FIG. 5.

FIG. 7 is a greatly enlarged cutaway drawing through the material of FIG. 6 showing the construction thereof.

FIG. 8 is a plan view of a combined privacy and sunscreen according to a preferred embodiment of the present invention intended to cover the windshield and adjacent side windows of the driver's compartment of a recreational vehicle in the manner of the prior art window cover of FIG. 4.

FIG. 9 is a simplified drawing in the manner of FIGS. 2-4 showing the manner of operation of the present invention in blocking the entry of sun and outside viewing into the recreational vehicle while permitting persons inside to see outside.

DESCRIPTION OF THE PREFERRED EMBODIMENT

The present invention is based on the recognition that a particular material could achieve the desired objects and provide additional benefits over that of its usual use if incorporated into an RV privacy sunscreen. As shown in FIG. 5, a non-woven material sold simply under the designation "outdoor material" by Intex Plastics company is intended for use in outdoor furniture such as the sling chair 28 wherein the material 30 is draped between the ends of chair frame 32 to form a sling surface upon which an occupant sits. The material 30 is non-woven; that is, it is laid up of parallel spaced rows perpendicularly disposed across parallel spaced columns which are then bonded together. The result is a plastic-like cloth which is lightweight, flexible, and can be sewn. Moreover, the non-woven structure provides benefits when adapted to the non-intended used of the present invention.

A segment of the outdoor material 30 is shown enlarged and simplified in FIG. 6. A greatly enlarged cross-section thereof is further shown in FIG. 7. As can be seen from the figures, the material 30 is comprised of a plurality of rows 34 and columns 36 of polyester which are at right angles to one another and offset from one another. The polyester rows and columns 34, 36 are held together with a bonding coating 38 on both sides of vinyl plastic. Moreover, the material of the rows 34 is thicker and set closer together than the material of the columns 36 such that as a result, as best seen with respect to FIG. 7, a tortuous path is formed for the passage of light rays 42 therethrough whereby the light passage area of the material for light rays perpendicular to the surface thereof is about 30% whereas light rays off the perpendicular see a light passage area increasingly less than 30% and, in fact, quickly approaching closer to 15%. In effect, when employed for the present purpose, the "outdoor material", which was intended to be used as a structural, weight-supporting or awning-/umbrella material, or the like, acts in the manner of a bi-directionally flexible thin-slatted venetian blind-like material.

A preferred combined windshield/adjacent side windows privacy sunscreen 44 according to the present invention and as made from the above-described preferred material 30 is shown in plan view in FIG. 8 and as attached to an RV 10 in FIG. 9. As with the prior art opaque screen 26 of FIG. 4, the windshield and adjacent side windows could be covered with separate screens, if desired. For preferred operation, i.e. maximum privacy and rejection of sun's rays 40 while permitting easy occupant viewing out, the rows 34 and columns 36 are disposed horizontally and vertically, respectively, over the windshield 12 and the side windows. This orientation places the sunfiltering material 36 with a minimized open area presented to outside viewers and high overhead mid-day sun so as to maximize those rejection features. Thus, as indicated by the arrows in FIG. 9, the occupants can see out (as indicated by the arrows 46) because of being so closed to the openings between the rows 38 and columns 40 while viewing into the RV 10 (as indicated by the arrows 48) is diminished because of the distance of outside viewers from the material 36 and the illumination of the broad non-open area thereof due to the sun's rays 30 thereon and the sun's rays 30, themselves, are substantially blocked except for a desirable level of lighting within the RV 10 therefrom.

In the preferred embodiment of the privacy sunscreen 44 of the present invention as shown in FIG. 8, the sunscreen 44 is comprised of three portions stitched together at 58. This is necessary so that when wrapped around the windshield 12 and side windows 20 the thicker, closely-spaced rows 34 will be horizontally disposed as desired. To accomplish this, as can be seen in FIG. 8, the center portion 60 which fits over the windshield 12 has its rows 34 horizontal while the two outer portions 62 which fit over the sidewindows 20 have their rows 34 angled with respect to the rows 34 of the center portion 60. Additionally in the preferred embodiment, the outer periphery 50 is folded over and stitched at 52 to form a strengthened periphery to which the fasteners 54 are attached by which the privacy sunscreen 44 is attached to the RV 10. In the preferred embodiment, fasteners 54 comprise first portions of both snaps and touch fastener material are attached in combination to the strengthened periphery of the privacy sunscreen 44 at spaced points, as indicated. This allows the RV's owner to employ mating second portions 56 of either type as best suits his needs.

Wherefore, having thus described my invention, I claim:

1. A privacy/sunscreen system for use on windows of recreational vehicles to limit light and outside viewing into the vehicle while permitting outside viewing from inside the vehicle comprising:

(a) a sheet of bi-directionally flexible material shaped to fit over the outside of a desired window of the vehicle, said sheet being of a non-woven plastic-like cloth comprising a plurality of closely spaced rows disposed on and bonded to a plurality of columns with said rows and columns disposed at right angles to one another, the material forming said rows being thicker and closer spaced than the material forming said columns and further forming a path for the passage of light therethrough which limits the maximum light passage area of said sheet to less than 30%, said sheet having said rows oriented to be horizontal when said sheet is disposed over a window; and, (b) a plurality of first portions of attachment means disposed at spaced points about the peripheral edge of said sheet for releasably engaging matching second portions of said attachment means to releasably attach said sheet to the vehicle window with said rows horizontally disposed.

2. The privacy/sunscreen system of claim 1 wherein:

(a) said screen has a center portion for fitting over a windshield of the vehicle and a pair of outer portions attached to and carried by said center portion for fitting over vehicle side windows adjacent said windshield, said rows of said outer portions being angled with respect to said rows of said center portion such that said rows and columns of all said portions are disposed horizontally and vertically, respectively, over both the windshield and the side windows when said screen is disposed over said windshield and said adjacent side windows; and, (b) said cloth being a composite material wherein said rows and columns are formed of strips of a polyester material laid over one another and bonded together by an overcoating of a vinyl plastic.

3. A removable, flexible, easily stored, combination privacy/sunscreen for use on the windshield and adjacent side windows of a recreational vehicle to limit light and outside viewing into the vehicle while permitting outside viewing from inside the vehicle comprising:

a sheet of bi-directionally flexible cloth material shaped to fit over the outside of the windshield and adjacent side windows of the vehicle and including means for releasably attaching said sheet to the vehicle in said above-described position, said sheet being of a non-woven material and comprising a plurality of closely spaced rows disposed on a plurality of columns with said rows and columns disposed at right angles to one another, the material forming said rows being thicker and closer spaced than the material forming said columns and further forming a path for the passage of light therethrough which limits the maximum light passage area of said sheet to less than 30%, said cloth being a composite material wherein said rows and columns are formed of strips of a polyester material laid over one another and bonded together by an overcoating of a vinyl plastic.

4. The privacy/sunscreen of claim 3 wherein:

said screen has a center portion for fitting over the windshield of the vehicle and a pair of outer portions attached to and carried by said center portion for fitting over the vehicle side windows adjacent the windshield, said rows of said outer portions being angled with respect to said rows of said center portion such that said rows and columns of all said portions are disposed horizontally and vertically, respectively, over both the windshield and the side windows when said screen is disposed over the windshield and adjacent side windows.

* * * * *